US007365833B1

(12) United States Patent
Granger

(10) Patent No.: US 7,365,833 B1
(45) Date of Patent: Apr. 29, 2008

(54) SYSTEM FOR MEASURING RADIANCE, TRANSMITTANCE AND REFLECTANCE

(75) Inventor: Edward Granger, Rochester, NY (US)

(73) Assignee: Delta E, Richmond, CA (US)

( * ) Notice: Subject to any disclaimer, the term of this patent is extended or adjusted under 35 U.S.C. 154(b) by 340 days.

(21) Appl. No.: 10/773,922

(22) Filed: Feb. 5, 2004

Related U.S. Application Data

(63) Continuation-in-part of application No. 10/406,948, filed on Apr. 3, 2003, now abandoned, which is a continuation of application No. 09/605,288, filed on Jun. 28, 2000, now Pat. No. 6,556,289.

(51) Int. Cl.
*G01J 1/42* (2006.01)

(52) U.S. Cl. ...................... 356/218; 356/226; 356/432; 356/445

(58) Field of Classification Search ................ 356/432, 356/433, 434, 435, 445, 448, 218, 226, 405, 356/414
See application file for complete search history.

(56) References Cited

U.S. PATENT DOCUMENTS 3,256,771 A 6/1966 Field et al.
3,304,435 A 2/1967 Norwood
3,612,881 A 10/1971 King
3,667,846 A 6/1972 Nater et al.
3,856,408 A * 12/1974 Hill et al. .................. 356/365
3,865,492 A 2/1975 Butler
4,003,660 A * 1/1977 Christie et al. ............. 356/407
4,344,150 A 8/1982 McLaughlin
4,411,521 A 10/1983 Jourdan et al.
5,142,138 A 8/1992 Yonezawa et al.
5,514,871 A 5/1996 Hayes et al.
5,576,831 A 11/1996 Nikoonahad et al.
5,959,291 A 9/1999 Jensen
6,556,289 B1 4/2003 Granger

FOREIGN PATENT DOCUMENTS

WO WO/02/0168 A2 3/2002

OTHER PUBLICATIONS

Notification of Transmittal of the International Search Report of the Declaration, corresponding PCT application No. PCT/US01/20235, International Searching Authority, European Patent Office, Jun. 25, 2001, 6 pages.

USPTO, "Office Action," mailed in related U.S. Appl. No. 10/406,948 on Sep. 5, 2003, 5 pages.

Notification of Transmittal of the International Search Report or the Declaration, corresponding PCT appl. No. PCT/US01/20235, International Searching Authority, European Patent Office, Jun. 25, 2001, 6 pages.

* cited by examiner

*Primary Examiner*—Layla G. Lauchman
(74) *Attorney, Agent, or Firm*—Davis Wright Tremaine LLP

(57) ABSTRACT

Two or more triangular apertures are employed to pass radiation from a source to a detector to reduce the amount of stray radiation received by the detector. Preferably, the two apertures are equilateral triangles oriented at 60° rotated relative to each other and have dimensions proportional to their distances from the detector. A Bessel filter is employed to reduce the effect of flicker and other rapid changes in intensity in the radiance from the source. The output of the sensor is integrated and sampled at sampling time intervals that are powers of two of time, and a reading is provided when the output of the integrator exceeds the same threshold under all radiation source intensity conditions so that the meter has a substantially constant resolution at different signal levels. Where the radiation from the source is transmitted or reflected by the sample before such radiation is detected by the detector, the instrument becomes a transmissometer or reflectometer.

27 Claims, 5 Drawing Sheets

B
16
18,18',58
12,52
20
A
B
16
18,18',58
12,52
20
C
A
B
16
18,18',58
12,52
20
A
C

SYSTEM FOR MEASURING RADIANCE, TRANSMITTANCE AND REFLECTANCE

CROSS-REFERENCE TO RELATED APPLICATION

This application is a continuation-in-part application, and claims the benefit, of U.S. patent application Ser. No. 10/406,948 filed Apr. 3, 2003 now abandoned which application is incorporated herein by reference in its entirety. U.S. patent application Ser. No. 10/406,948 is a continuation application of U.S. patent application Ser. No. 09/605,288, filed Jun. 28, 2000, now U.S. Pat. No. 6,556,289.

BACKGROUND OF THE INVENTION

This invention relates in general to a system for measuring radiance of radiation sources, and in particular, to luminance meters of improved performance, as well as other parameters such as transmittance and reflectance.

Luminance meters have wide applications. It is used, for example, in radiology for calibrating the intensity of radiation sources such as x-ray sources in order to be able to compare images for improve accuracy.

Conventional luminance meters employed circular apertures for passing radiation from the radiation source to the sensor. In such conventional luminance meters, due to the symmetry of the circular apertures employed, stray radiation has the maximum probability of reflection at the edges of the apertures to reach the sensor.

When a conventional luminance meter is employed to measure radiation sources with rapidly varying intensities, depending on the sampling time period chosen, the meter may give a reading that is widely different from that perceived from the human eye. For example, when the conventional luminance meter is employed to measure the radiance from a cathode array tube screen, for example, the radiance from the phosphor decays rapidly. Therefore, depending upon the sampling time period of the conventional luminance meter employed when the screen is measured, the radiance measured may be that from the phosphor after the intensity of the radiance has declined significantly, so that the reading given by the meter may differ from that observed by the human eye by a significant amount.

While conventional luminance meters may be adequate for some applications, they do not provide adequate dynamic range and resolution for other applications such as in radiology requiring higher performance. It is, therefore, desirable to provide improved luminance meters that can meet the needs of such other applications with higher performance requirements.

SUMMARY OF THE INVENTION

This invention is based on the observation that by employing an asymmetric aperture or a combination of asymmetric apertures, the amount of stray radiation received by the sensor or detector can be reduced compared to that in the case of the conventional luminance meters employing circular apertures. This invention is also based on the observation that, by filtering radiation from the source to be measured by a filter having a temporal frequency response that mimics that of the human eye, the accuracy of measurement can be much improved. In addition, performance of the meter can be enhanced by integrating the output of the sensor and sampling the integrated output at time intervals that are exponential functions of time to provide a reading.

In this manner, high and substantially constant resolution of the meter can be achieved when the meter is used to measure radiation sources of very different intensities.

Where the radiation from the source is transmitted or reflected by the sample before such radiation is detected by the detector, the instrument becomes a transmissometer or reflectometer that detects the transmittance, absorbance or reflectance of the sample.

DETAILED DESCRIPTION OF THE EMBODIMENTS

Figure 1:
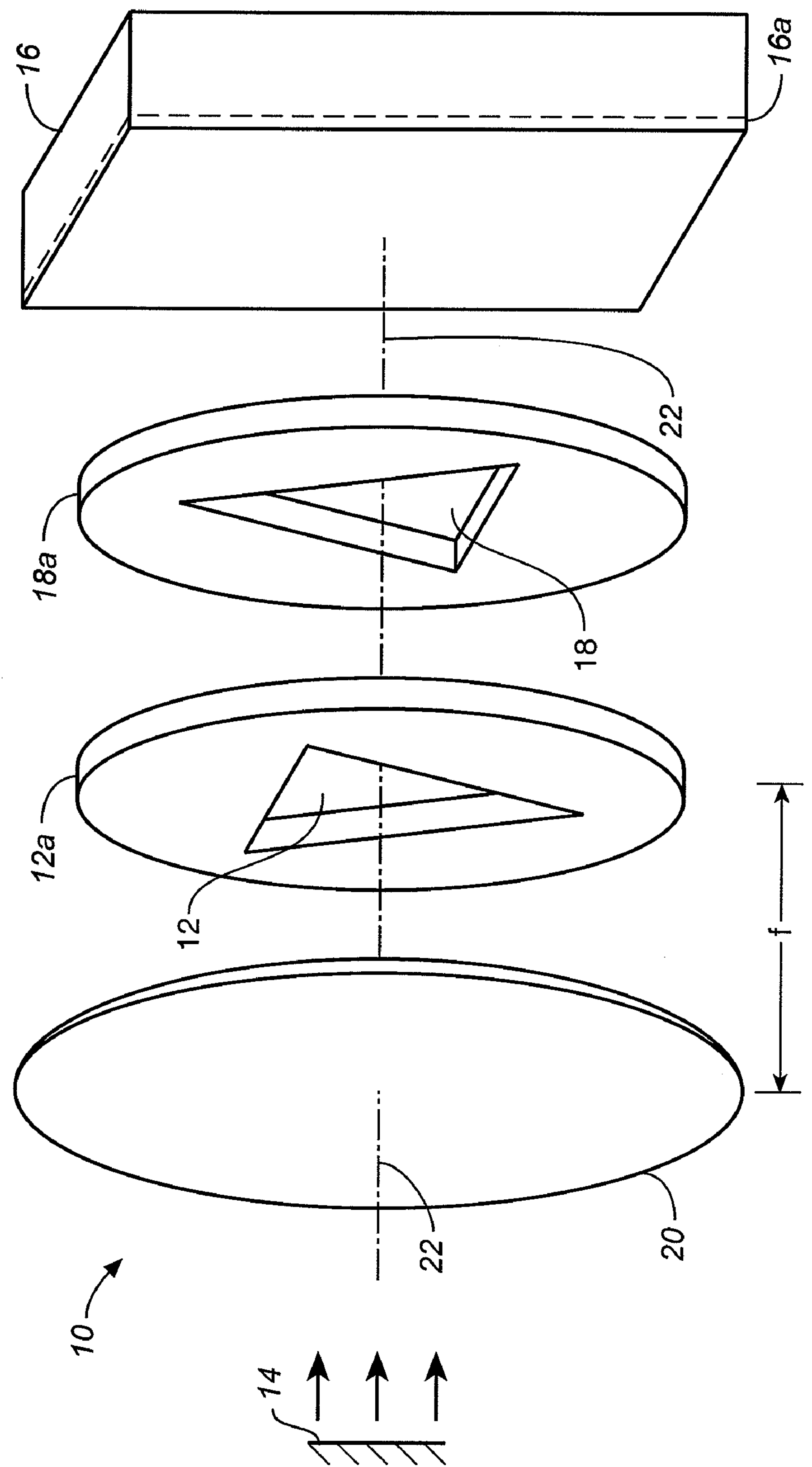
FIG. 1 is a perspective view of components of a luminance meter to illustrate a preferred embodiment of the invention.

FIG. 1 is a perspective view of some of the components of a luminance meter to illustrate an embodiment of the invention. As noted above, one of the reasons why much stray light is detected by sensors in conventional luminance meters is that conventional luminance meters employ circular apertures. Because of the symmetry of the circular apertures, stray light is more likely to enter and pass through the apertures to reach the detector. In contrast, in the luminance meter 10 of FIG. 1, one or more polygonal apertures are employed. Due to the asymmetry of the polygonal apertures, the amount of stray radiation that can reach the detector is much reduced. Thus, as shown in FIG. 1, a polygonal (triangular, in this case) aperture 12 passes radiation from radiation source 14 to sensor 16. By employing an asymmetric aperture such as a polygonal aperture 12 which is formed in an opaque plate such as a metal plate 12*a*, the amount of stray light originating from radiation source 14 that reaches sensor 16 is reduced.

Preferably, a second polygonal aperture 18 formed in an opaque plate 18*a* is employed and placed between aperture 12 and sensor 16 to further block the passage of stray radiation that has passed aperture 12 so that the amount of stray radiation that reaches sensor 16 is further reduced. Preferably, a collimating lens 20 collects the radiation supplied by source 14 and images the radiation to the apertures 12 and 18 of the sensor 16. Thus, collimating lens 20 may be placed so that it is at its focal length f from aperture 12. In this manner, it is not necessary for the apertures 12 and 18 to be located close to the radiation source 14 to collect adequate intensity of radiation to make a measurement and the luminance meter 10 is more convenient for users.

Figure 2:
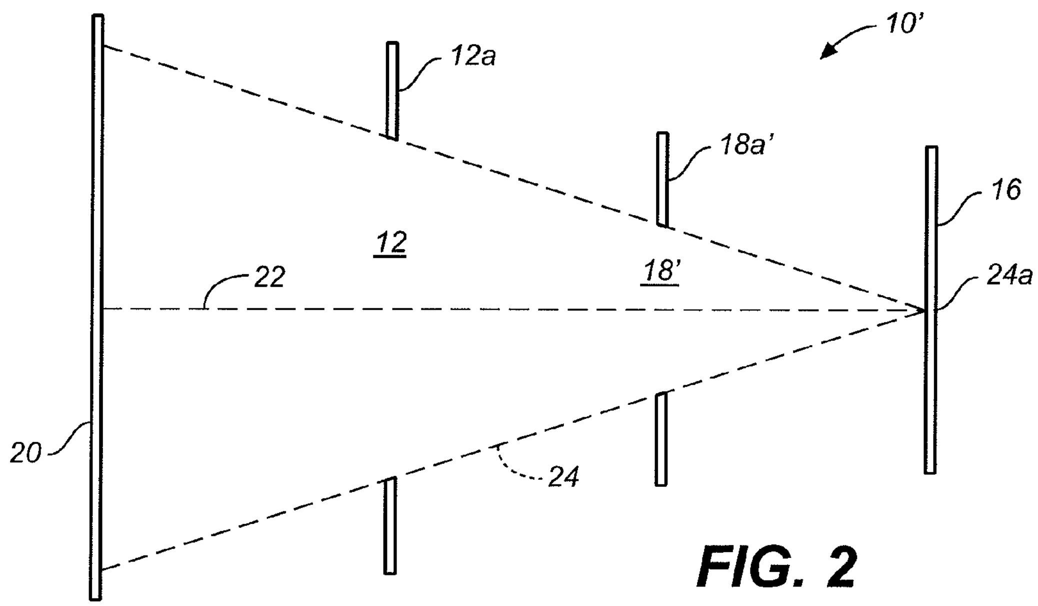
FIG. 2 is a schematic view of the two triangular apertures of FIGS. 1 and 3A and of the lens of FIG. 1 illustrating the preferred dimensions of the two apertures to illustrate the embodiment of FIGS. 1 and 3A.

While in FIG. 1, the two apertures 12 and 18 may appear to be of comparable dimensions, it is preferable for the aperture (labeled 18' in FIG. 2) to be of smaller dimensions compared to aperture 12 as illustrated in FIG. 2. As shown in FIG. 1, the two apertures 12 and 18' are oriented so that they do not exactly overlap when viewed along axis 22 of the meter 10 where axis 22 substantially passes through the centers of lens 20 and apertures 12 and 18'. In this manner, the stray radiation that passes through aperture 12 near the corners of the aperture are blocked by plate 18*a*' and does not pass through aperture 18'. This is particularly effective where aperture 18' is smaller than aperture 12. In the preferred embodiment, apertures 12 and 18' are triangular in shape, although other polygonal shapes are possible, such as squares. In general, the number of sides of the polygonal apertures 12 and 18 (or 18') may be n, where n is a positive integer greater than 2. Obviously, the greater the value of n, the closer are the shapes of the polygonal apertures to a circular aperture so that these polygonal apertures will be less effective in reducing the amount of stray radiation that reaches the sensor.

As shown in FIG. 2, a cone may be formed with the circular aperture of the lens 20 being the base of the cone 24 and the apex 24*a* of the cone being a point at sensor 16. The apertures 12 and 18' are preferably of such dimensions that all of the sides of the triangular shapes of the apertures touch the surface of the cone 24 as shown in FIG. 2. Preferably, the apertures 12 and 18' are equilateral triangles. Hence, from FIG. 2 is seen that the dimensions of apertures 12 and 18' are substantially proportional to the distances from sensor 16.

Figure 3A:
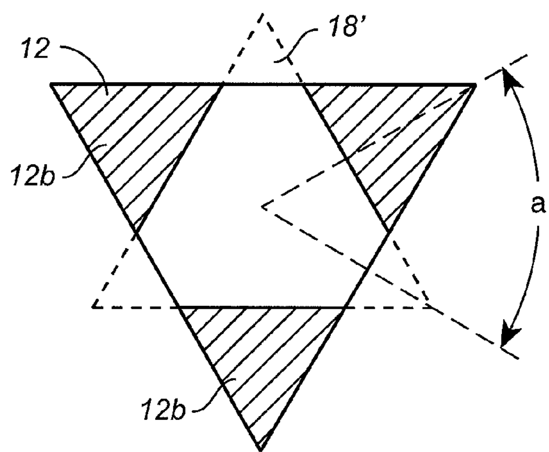
FIG. 3A is a schematic view of two triangular apertures and their relative orientations when used in the embodiment of FIG. 1 to illustrate the preferred embodiment of the invention.

FIG. 3A is a schematic view of the two apertures 12 and 18' when viewed along the axis 22 of system 10 to illustrate a preferred embodiment of the invention. Different from the dimensions shown in FIG. 1, the dimensions of aperture 18' is shown to be smaller than the dimensions of aperture 12 as shown in FIG. 3A. Furthermore, the relative orientation of the two apertures are such that they are rotated by an angle a which is preferably about 60°, so that aperture 18' and plate 18*a*' are in the best position to block stray radiation. In this manner, the stray radiation that passes through the shaded areas 12*b* of aperture 12 may be blocked by plate 18*a*' and does not pass through aperture 18'. Since aperture 18' is smaller than aperture 12, the shaded areas 12*b* are relatively larger than would be the case if the two apertures are of the same size, so that aperture 18' would be more effective in blocking stray radiation to the sensor.

Figure 3B:
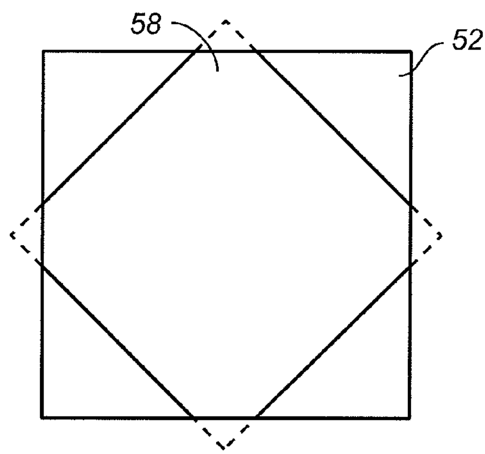
FIG. 3B is a schematic view of two substantially square shaped apertures that may be used instead of triangular apertures in the embodiment of FIG. 1 to illustrate an alternative embodiment.

FIG. 3B is a schematic view of two apertures 52 and 58 which may be used instead of apertures 12 and 18 or 12 and 18' to illustrate another embodiment of the invention. Where apertures 12 and 18 or 12 and 18' are replaced by apertures 52 and 58 as shown in FIG. 3B, the luminance meter so constructed would also be effective in reducing the amount of stray radiation that reaches the sensor, although the arrangement in FIG. 3B would be less effective compared to that in FIG. 3A.

Figure 4:
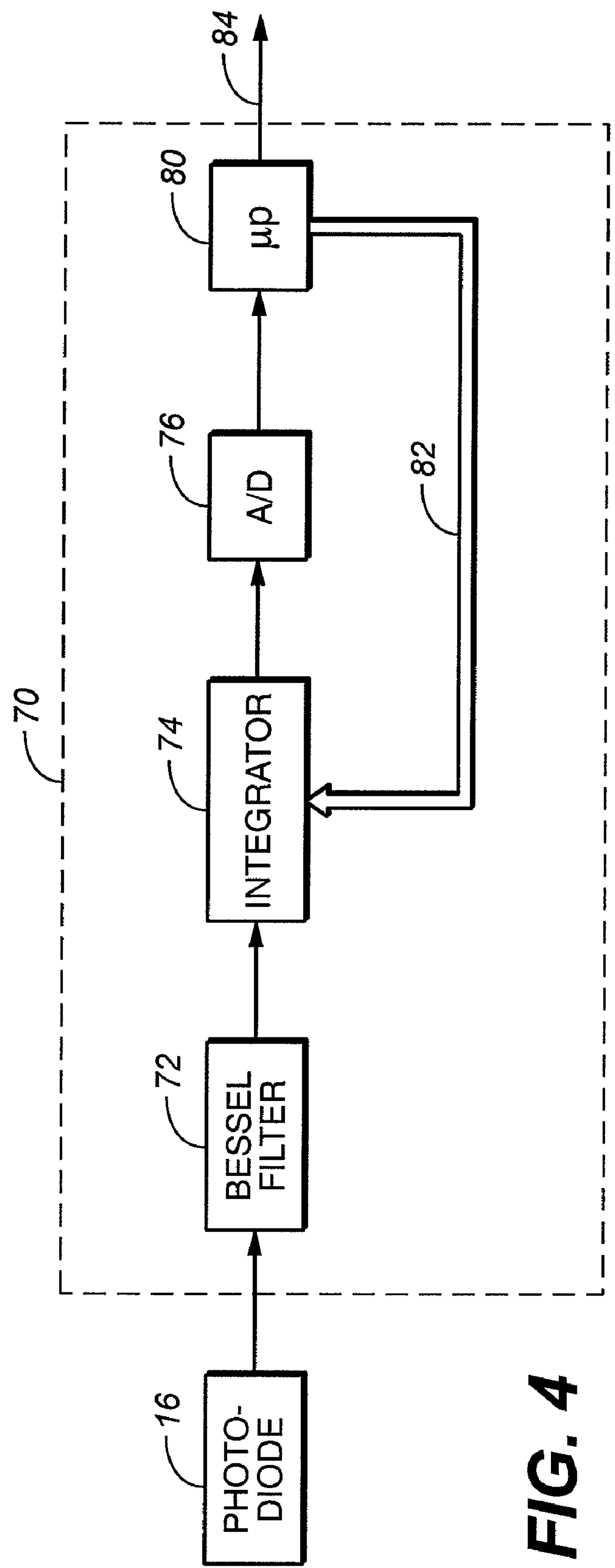
FIG. 4 is a block diagram of a sensor of FIG. 1 and a circuit for processing the output of the sensor to illustrate an embodiment of the invention.

FIG. 4 is a block diagram of sensor 16 and other components of meter 10, where such components include a circuit for processing the output of sensor 16, to illustrate a preferred embodiment of the invention. As noted above, the intensity from radiation source 14 may change rapidly over time. This is the case, for example, for cathode array tubes where the radiance emitted by the phosphor decays rapidly. Such rapid changes and decay is not noticed by the eye; instead the eye accumulates to provide an average of the radiation detected logarithmically over time. However, in conventional luminance meters, depending upon the time periods where radiation from source 14 is measured, the radiance of the source detected may be quite different from that observed by the human eye. This is overcome in this invention by employing in the circuit 70 of luminance meter 10, a filter to filter the output of sensor 16; The sensor 16 may be a photo diode, a photomultiplier tube or any other suitable type of optical sensor. Filter 72 has a temporal frequency response that resembles that of the human eye. Preferably, filter 72 includes a Bessel filter with an integration period of about ⅓ of a second. The output of filter 72 is supplied to an integrator 74 which may include a capacitor. The output of integrator 74 is converted to a digital signal by analog-to-digital (A/D) convertor 76 whose output is supplied to a microprocessor 80.

The human eye has the amazing capability to distinguish between fine shades of grey in bright sunlight as well as in a dimly lit room. Conventional luminance meters, however, typically have poor performance in this respect. The luminance meter in this application is able to achieve substantially constant resolution at different signal levels so that the meter is able to distinguish also between shades of grey in bright sunlight as well as in a dimly lit room. This is achieved by means of a feature implemented using integrator 74, A/D convertor 76 and microprocessor 80. Integrator 74 includes a capacitor which accumulates the analog signal output from filter 72.

The capacitor in integrator 74 is discharged as part of the initialization process by microprocessor 80 which controls the integrator 74 through bus 82. For this purpose, integrator 74 includes a first switch which can be used to provide a short circuit to the capacitor in order to discharge the capacitor, so that when this first switch is switched on by microprocessor 80, the switch closes the circuit to discharge the capacitor in integrator 74. This is done when the capacitor in integrator 74 is electrically disconnected from filter 72 through a second switch also controlled by microprocessor 80 through bus 82. Frequently, however, there may be a residual charge at the capacitor even after the discharge process, so that the output of the integrator 74 will not be exactly zero. This value is converted to digital value by convertor 76 and is read by microprocessor 80. This value may then be subtracted from any subsequent readings to improve their accuracy.

Therefore, to start the process of processing the output of filter 72, microprocessor 80 through bus 82 performs the above-described process by discharging the capacitor and recording the reading when the filter 72 is electrically disconnected from integrator 74. Thereafter, microprocessor 80 causes the second switch to electrically connect the output of filter 72 to integrator 74 to charge the capacitor and starts a clock. The voltage across the capacitor continues to build in response the output of filter 72. This voltage value is converted by A/D convertor 76 to a digital value. Convertor 76 has a dynamic range. In one embodiment, convertor 76 has a 16 bit dynamic range, although only the first 12 bits are used for improved accuracy. In order for the luminance meter 10 to adjust to the different signal levels, such as where the meter is used in bright sunlight as opposed to being used in a dimly lit room, the time during which the integrator 74 integrates the output of filter 72 is controlled to account for the difference in signal level. In the preferred embodiment, this is done by the microprocessor 80 sampling the output in the integrator 74 at time intervals that are exponential functions of time. Thus, if the first sampling time interval is 50 milliseconds, the sampling time interval would be 100 milliseconds and the third, 100 milliseconds and the fourth 200 milliseconds and so on. In other words, preferably, a sampling device employed such as the convertor 76 and microprocessor 80 samples the output of the integrator at time intervals that are powers of 2 of time. This mimics the function of the human eye which also accumulates signals logarithmically. When the output of the A/D convertor 76 exceeds a certain predetermined threshold value relative to its dynamic range, microprocessor 80 would record such value and provide it as the output of the luminance meter 10 at output 84.

Thus, in bright sunlight, the voltage across the capacitor in integrator 74 would quickly build up, causing the output of convertor 76 to rapidly exceed the threshold after a few sampling time intervals, and microprocessor 80 would then compare the output of convertor 76 to the preset threshold and provide a reading at output 84 when this threshold is exceeded. In a dimly lit room, however, it may take a larger number of sampling time intervals for the charge across the capacitor to build up in order for the output of convertor 76 to exceed the threshold. Since the same threshold is employed by microprocessor 80 when the meter is used in bright sunlight and in a dimly lit room (i.e. at different radiance signal levels of source 14), the output 84 would provide a substantially constant resolution reading despite the use of the meter at different radiance signal levels. The sampling time intervals that are powers of two of time may be simply implemented by means of a floating point ladder which may form a part of the convertor 76. A similar function may obviously be performed by microprocessor 80 instead of using a floating point ladder in an alternative embodiment. Sampling time intervals that are other than powers of two of time may obviously be used and are within the scope of the invention.

Where desired, a band pass filter may be employed between aperture 18 and sensor 16. Preferably, this filter may comprise a layer of material such as 16*a* on top of the sensor 16 as shown in FIG. 1. The width of the passband of the filter may have any value and is preferably within the range of 100 to 300 nm. In this manner, only the radiance of the radiation from source 14 within the passband or filter 16*a* would be measured by meter 10.

Figure 5:
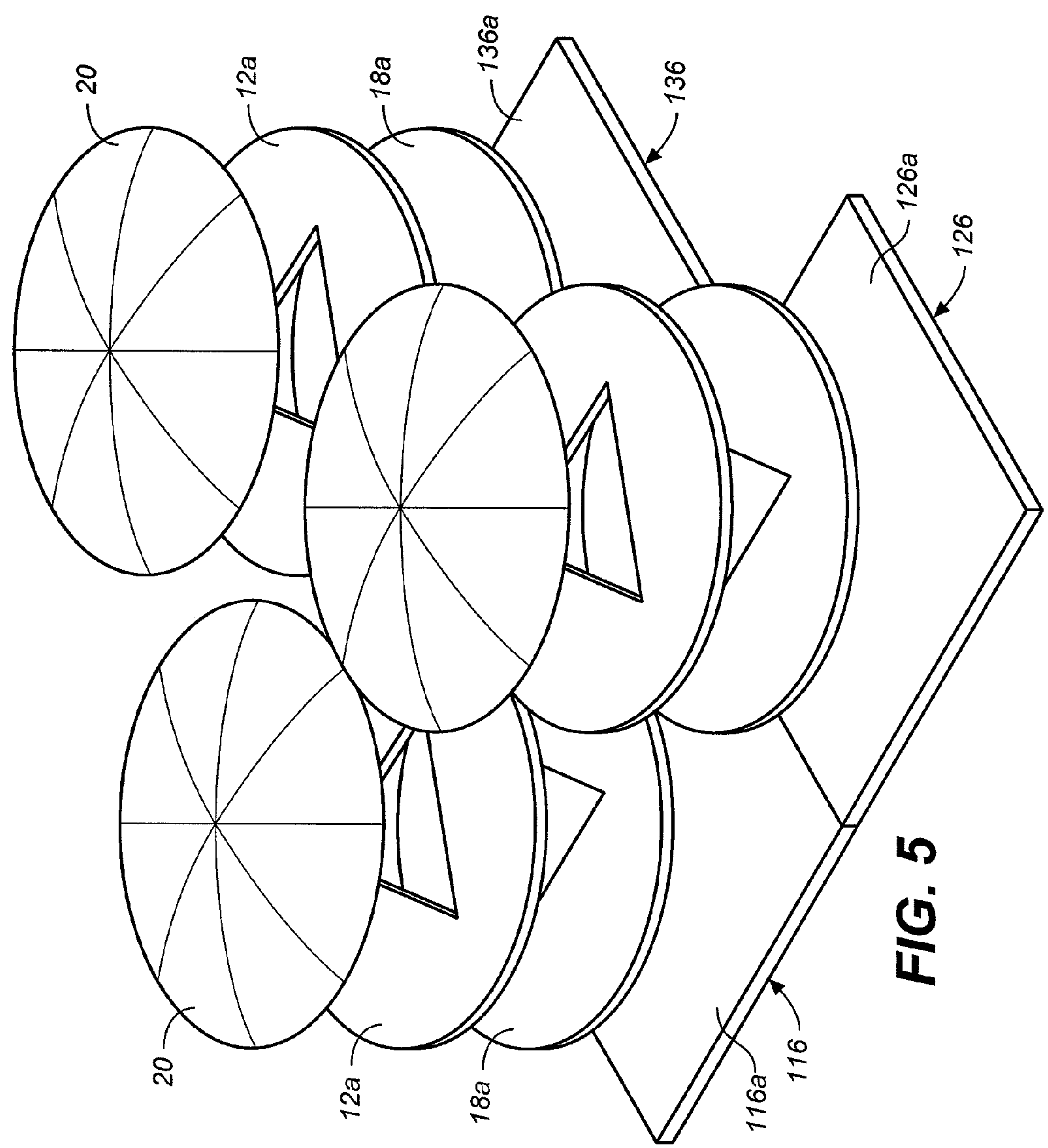
FIG. 5 is a perspective view of a luminance meter with separate optical paths and different sensors for three different ranges of wavelengths to illustrate another embodiment of the invention.

FIG. 5 is a perspective view of some of the components of a luminance meter for measuring simultaneously the radiance from a source in three different ranges of wavelengths of radiation. Thus, sensor 116 may have a filter 116*a* that has a spectral passband in the "red" area, sensor 126 may have a filter 126*a* having a passband in the "blue" area and sensor 136 has a filter 136*a* having a passband in the "green" area. In this manner, the different radiances from the same source within all three "red," "blue," and "green" ranges of wavelengths may be detected simultaneously.

Figure 6C:
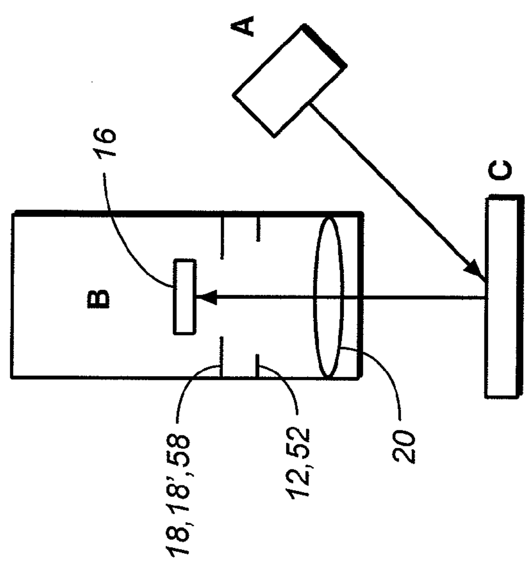
FIGS. 6A, 6B and 6C are schematic views of three instruments for detecting respectively, the radiance of a source, the transmittance of a sample and the reflectance of a sample. For simplicity in description, identical components are labeled by the same numerals in this application.
Figure 6B:
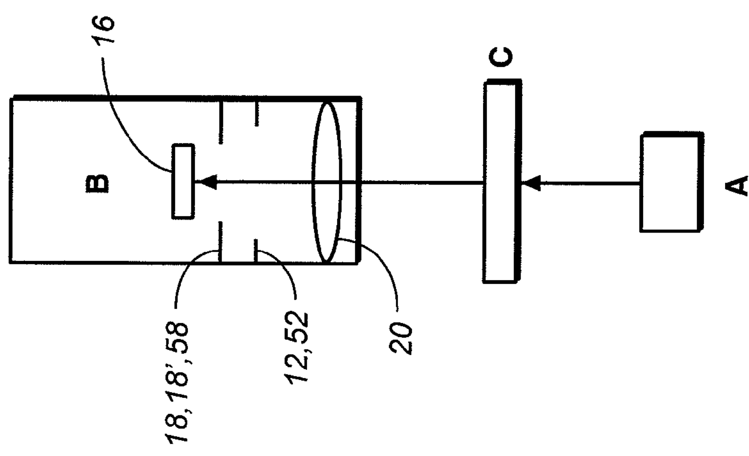
Figure 6A:
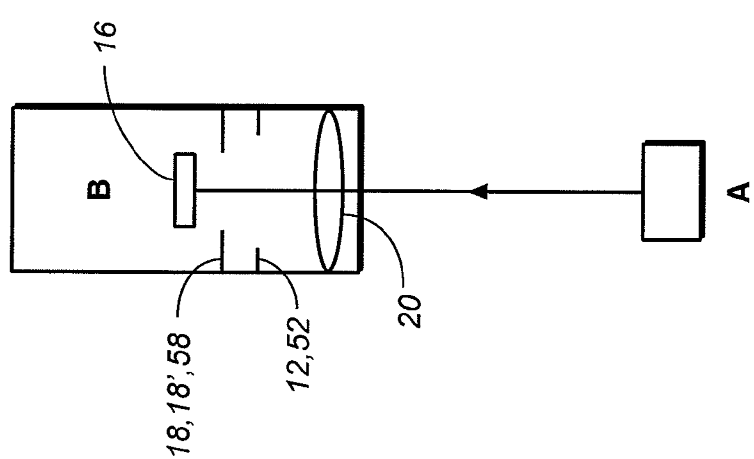

The luminance meter 10 has been described above. In schematic form, it is shown again in FIG. 6A, where a radiation source A to be measured supplies radiation to the luminance meter B similar in construction to any one of the luminance meters described above. The instrument shown in FIG. 6A can be converted into one for measuring the transmittance or reflectance of a sample, by using source A to supply radiation to a sample C, and the radiation that is from source A and that is transmitted (FIG. 6B) or reflected (FIG. 6C) by the sample C is detected instead, by the luminance meter B. Thus, in reference to FIGS. 1, and 6B, 6C for example, the radiation from source 14 (i.e. source A in FIGS. 6A-6C) that is transmitted or reflected by sample C in FIGS. 6B, 6C is collected by lens 20 which images the radiation onto apertures 12 (or 52) and 18 (or 18', 58), or polygonal apertures of still other shapes in the manner described above. The radiation passing through the apertures and reaching detector 16 is then detected by detector 16 and processed as described above.

When transmittance or reflectance of a sample is measured, it may not be necessary to employ a filter such as filter 16*a*, or a specialized filter may be employed instead, depending on the application. To measure the absorbance characteristics of a sample, before or after the transmittance of the sample is measured, the sample is removed from the optical path in FIG. 6B, and the detector is used to measure the background. The difference between the two readings will indicate the absorbance of the sample. Alternatively, rather than having to make two sequential measurements, FIG. 6B can be modified by diverting a portion of the radiation from source A (such as by means of a beam splitter), where such diverted portion is measured simultaneously by a second detector or sensor. A comparison of the readings of the two different detectors will indicate the absorbance of the sample.

While the invention has been described above by reference to various embodiments, it will be understood that changes and modifications may be made without departing from the scope of the invention, which is to be defined only by the appended claims and their equivalents. All references referred to herein are incorporated by reference herein in their entireties.

What is claimed is:

1. An apparatus for measuring transmittance or reflectance of a sample, comprising:

a source of radiation;

a sensor;

at least a first polygonal aperture for passing to the sensor radiation that is from the source and that has been transmitted through or reflected from the sample, said sensor responsive to the radiation through the aperture to provide an output;

a second polygonal aperture passing to the sensor radiation that is from the source and that has been transmitted through or reflected from the sample, said two apertures oriented so that they are rotated relative to each other by an angle to reduce stray radiation that reaches the sensor; and a circuit providing a reading in response to the output.

2. The apparatus of claim 1, wherein said polygonal apertures are substantially triangular in shape.

3. The apparatus of claim 2, wherein the shapes of said polygonal apertures are substantially equilateral triangles.

4. The apparatus of claim 3, wherein the first and the second apertures are of dimensions that are substantially proportional to distances between the apertures and the sensor, and wherein the two apertures are oriented so that they are rotated by 60 degrees relative to each other.

5. An apparatus for measuring transmittance or reflectance of a sample, comprising:

a source of radiation;

a sensor;

at least a first and a second substantially equilateral triangular aperture for passing to the sensor radiation that is from the source and that has been transmitted through or reflected from the sample, said sensor responsive to the radiation through the aperture to provide an output; and a circuit providing a reading in response to the output; said apparatus further comprising at least one color filter filtering the radiation from the source to the sensor so that the apparatus measures the radiance of the source within at least one predetermined spectral pass band.

6. The apparatus of claim 5, wherein said at least one color filter is such that the apparatus measures the radiance of the source within said at least one predetermined spectral pass band of a predetermined width within a range of 100 to 300 nm.

7. An apparatus for measuring transmittance or reflectance of a sample, comprising:

a source of radiation;

a sensor;

at least one aperture for passing to the sensor radiation that is from the source and that has been transmitted through or reflected from the sample, said sensor responsive to the radiation through the aperture to provide an output; and a circuit providing a reading in response to the output, wherein said circuit includes an integrator and a sampling device that samples an output of the integrator at time intervals that are exponential functions of time to provide the reading.

8. The apparatus of claim 7, wherein the sampling device samples the output of the integrator at time intervals that are powers of 2 of time.

9. The apparatus of claim 7, said integrator having a substantially constant resolution at different signal levels.

10. The apparatus of claim 9, said circuit having a dynamic range, wherein said sampling device samples the output of the integrator and provides said reading when the output exceeds a predetermined value relative to the dynamic range.

11. The apparatus of claim 10, wherein the sampling device samples the output of the integrator at time intervals that are powers of 2 of time, and wherein said predetermined value is not more than half or one-third of the dynamic range.

12. The apparatus of claim 7, said integrator including an A/D converter.

13. The apparatus of claim 7, further comprising a collimating lens spaced at substantially a focal length from the first aperture, so that the lens focuses radiation from the source to the aperture.

14. An apparatus for measuring transmittance or reflectance of a sample, comprising:

a source of radiation;

a sensor;

at least one aperture for passing to the sensor radiation that is from the source and that has been transmitted through or reflected from the sample, said sensor responsive to the radiation through the aperture to provide an output;

a filter filtering radiation from the source received at the sensor, said filter having a frequency response that matches that of the human eye and said filter being a Bessel filter with an integration period of about ⅓ second; and a circuit providing a reading in response to the output.

15. The apparatus of claim 14, further comprising a collimating lens spaced at substantially a focal length from the first aperture, so that the lens focuses radiation from the source to the aperture.

16. An apparatus for measuring transmittance or reflectance of a sample, comprising:

a source of radiation;

a sensor;

at least one aperture for passing to the sensor radiation that is from the source and that has been transmitted through or reflected from the sample, said sensor responsive to the radiation through the aperture to provide an output;

a filter filtering radiation from the source received at the sensor, said filter having a frequency response that matches that of the human eye;

a circuit providing a reading in response to the output; and at least one color filter filtering the radiation from the source to the sensor so that the apparatus measures the radiance of the source within at least one predetermined wavelength pass band.

17. An apparatus for measuring transmittance or reflectance of a sample, comprising:

a source of radiation;

a sensor;

at least one aperture for passing to the sensor radiation that is from the source and that has been transmitted through or reflected from the sample, said sensor responsive to the radiation through the aperture to provide an output;

a filter filtering radiation from the source received at the sensor, said filter having a frequency response that matches that of the human eye; and a circuit providing a reading in response to the output; and an integrator and a sampling device that samples an output of the integrator at time intervals that are exponential functions of time to provide the reading.

18. The apparatus of claim 17, wherein the sampling device samples the output of the integrator at time intervals that are powers of 2 of time.

19. The apparatus of claim 17, said integrator including an A/D converter.

20. The apparatus of claim 17, said integrator having a substantially constant resolution at different signal levels.

21. The apparatus of claim 20, said circuit having a dynamic range, wherein said sampling device samples the output of the integrator and provides said reading when the output exceeds a predetermined value relative to the dynamic range.

22. The apparatus of claim 21, wherein the sampling device samples the output of the integrator at time intervals that are powers of 2 of time, and wherein said predetermined value is not more than half or one-third of the dynamic range.

23. A method for measuring transmittance or reflectance of a sample, comprising:

passing radiation that has been transmitted or reflected by the sample to a sensor through an aperture, said sensor responsive to the radiation through the aperture to provide an output; and integrating the output of the sensor; and sampling the integrated output of the sensor at time intervals that are exponential functions of time to provide a reading.

24. The method of claim 23, wherein the sampling samples the integrated output at time intervals that are powers of 2 of time.

25. An apparatus for measuring transmittance or reflectance of a sample, comprising:

a source of radiation;

a sensor;

at least a first and a second substantially equilateral triangular aperture for passing radiation that is from the source and that has been transmitted or reflected by the sample to the sensor through an aperture, said sensor responsive to the radiation through the aperture to provide an output; and a circuit providing a reading in response to the output;

wherein the two apertures are oriented so that they are rotated by substantially 60 degrees relative to each other.

26. An apparatus for measuring transmittance or reflectance of a sample, comprising:

a source of radiation;

a sensor;

at least one aperture for passing to the sensor radiation that is from the source and that has been transmitted or reflected by the sample through an aperture, said sensor responsive to the radiation through the aperture to provide an output; and a circuit providing a reading in response to the output, wherein said circuit includes an integrator and a sampling device that samples an output of the integrator at time intervals such that said integrator has a substantially constant resolution at different signal levels.

27. A method for measuring transmittance or reflectance of a sample, comprising:

passing radiation that has been transmitted or reflected by the sample to a sensor through an aperture, said sensor responsive to the radiation through the aperture to provide an output; and integrating the output of the sensor; and sampling the integrated output of the sensor at time intervals to provide a reading such that the reading has a substantially constant resolution at different signal levels.

* * * * *